United States Patent [19]
Lary

[11] 4,349,871
[45] Sep. 14, 1982

[54] DUPLICATE TAG STORE FOR CACHED MULTIPROCESSOR SYSTEM

[75] Inventor: Richard F. Lary, Colorado Springs, Colo.

[73] Assignee: Digital Equipment Corporation, Maynard, Mass.

[21] Appl. No.: 116,151

[22] Filed: Jan. 28, 1980

[51] Int. Cl.³ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,736,566 | 5/1973 | Anderson et al. | 364/200 |
| 3,815,099 | 6/1974 | Cohen et al. | 364/200 |
| 3,999,163 | 12/1976 | Levy et al. | 364/200 |
| 4,045,781 | 8/1977 | Levy et al. | 364/200 |
| 4,056,844 | 11/1977 | Izumi | 364/900 |
| 4,077,059 | 2/1978 | Cardi et al. | 364/200 |

Primary Examiner—Joseph M. Thesz
Assistant Examiner—Eddie P. Chan
Attorney, Agent, or Firm—Cesari and McKenna

[57] ABSTRACT

A cached multiprocessor system operated in an ordered pipeline timing sequence in which the time slot for use of the cache is made long enough to permit only one cache access. Further, the time slot for data transfers to and from the processors succeeds the time slot for accessing the cache. The sequence is optimized for transactions that require only one cache access, e.g., read operations that hit the cacgenerally require a second cache access in order to update or allocate the cache. These transactions are entered into a queue with order preserved prior to permitting a second access to the cache. Also, a duplicate tag store is associated with the queue and maintained as a copy of the tag store in the cache. Whenever a cache tag is to be changed, a duplicate tag in the duplicate tag store is changed prior to changing the cache tag. The duplicate tag store thus always provides an accurate indication of the contents of the cache. The duplicate tag store is used to determine whether a second access to the cache for an update is necessary.

3 Claims, 20 Drawing Figures

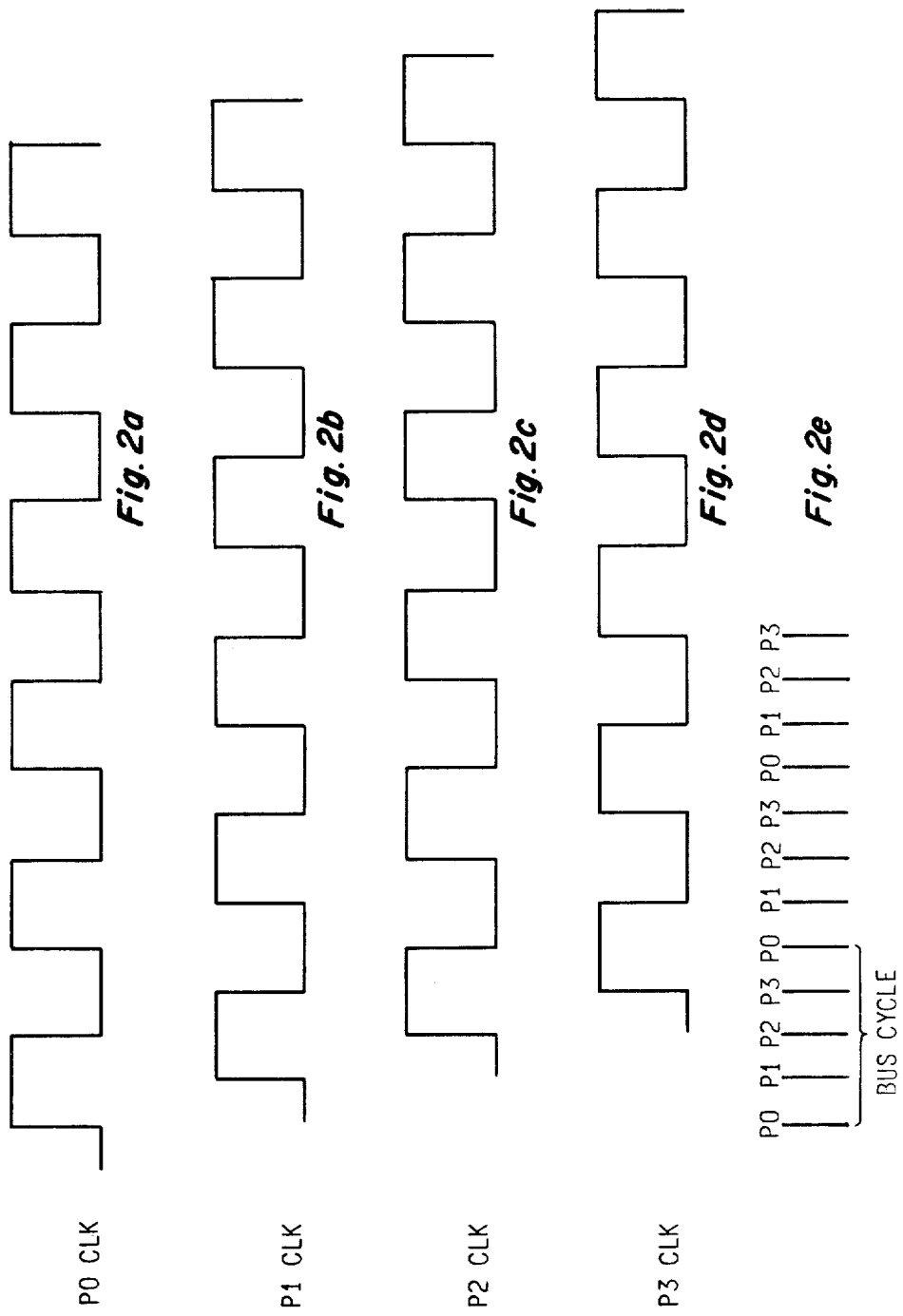

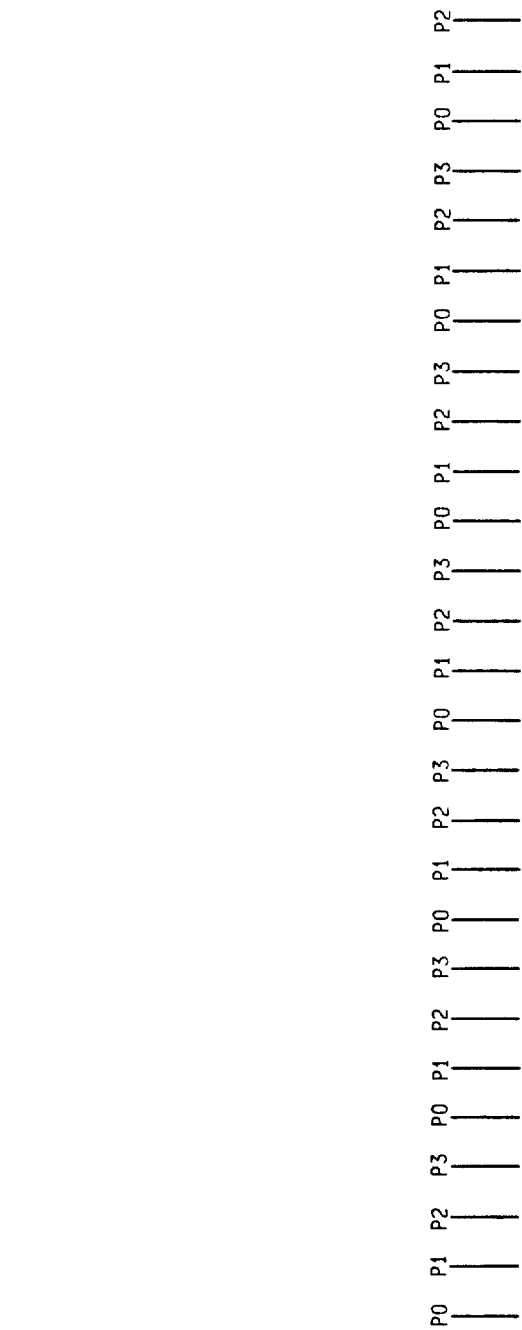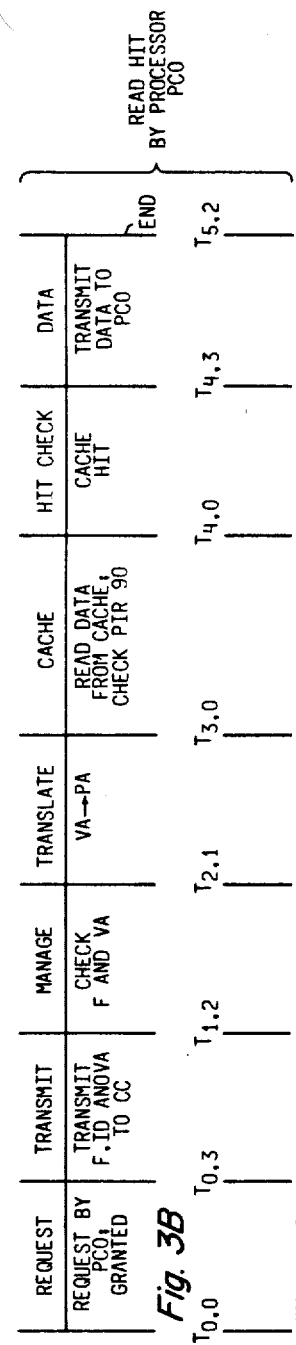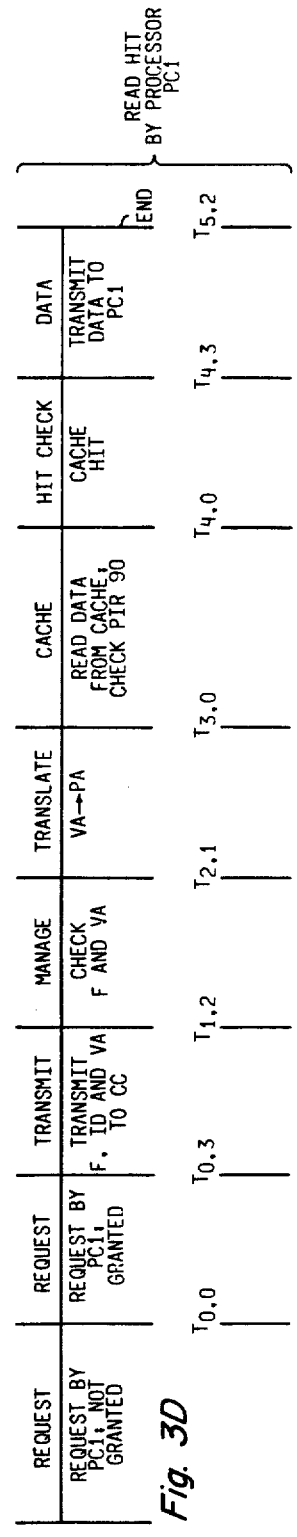

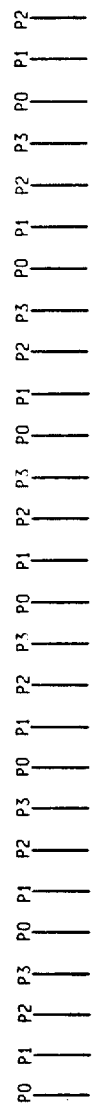
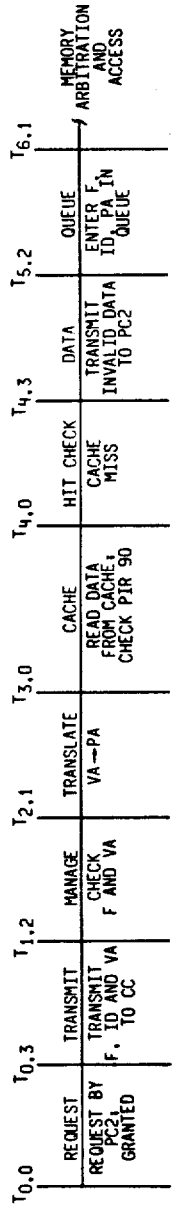
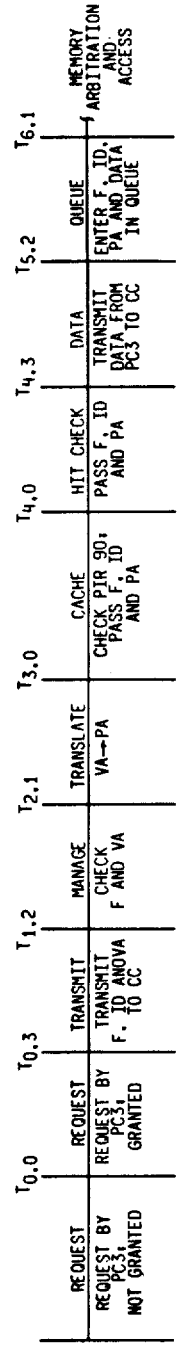
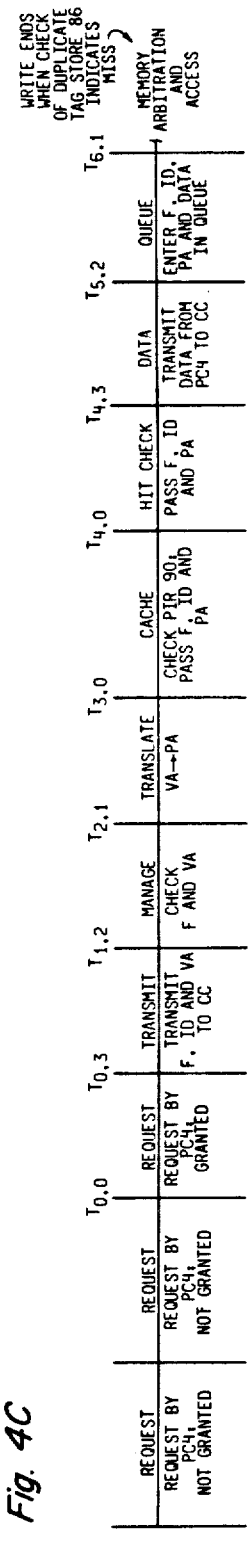
Fig. 4A
Fig. 4B
Fig. 4C
Fig. 4D

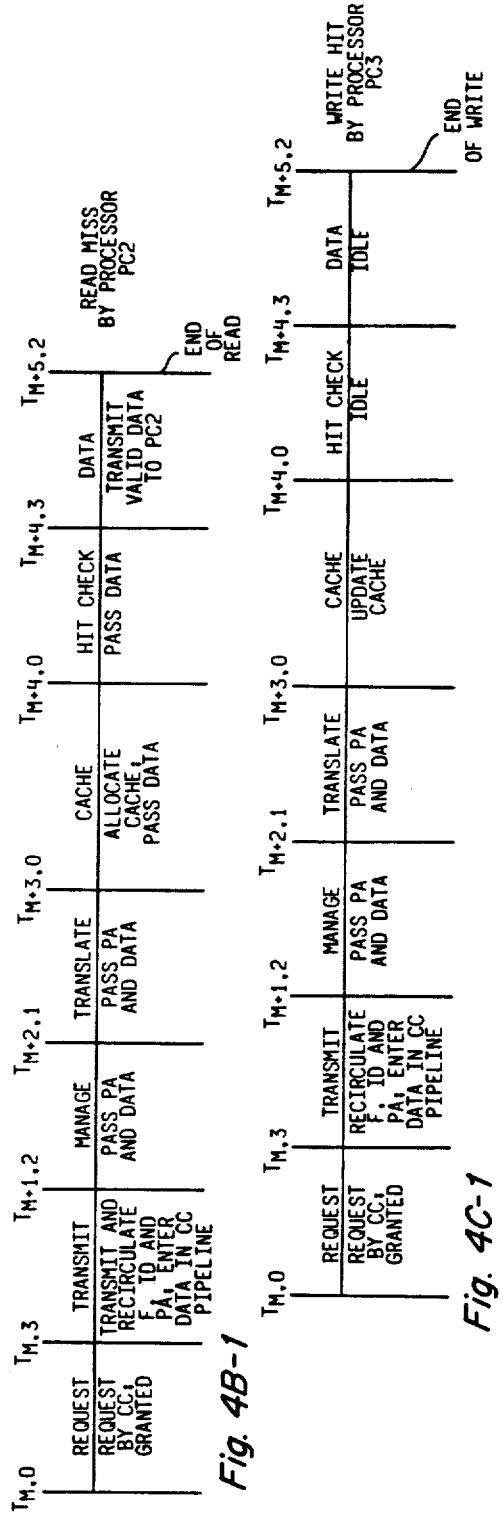

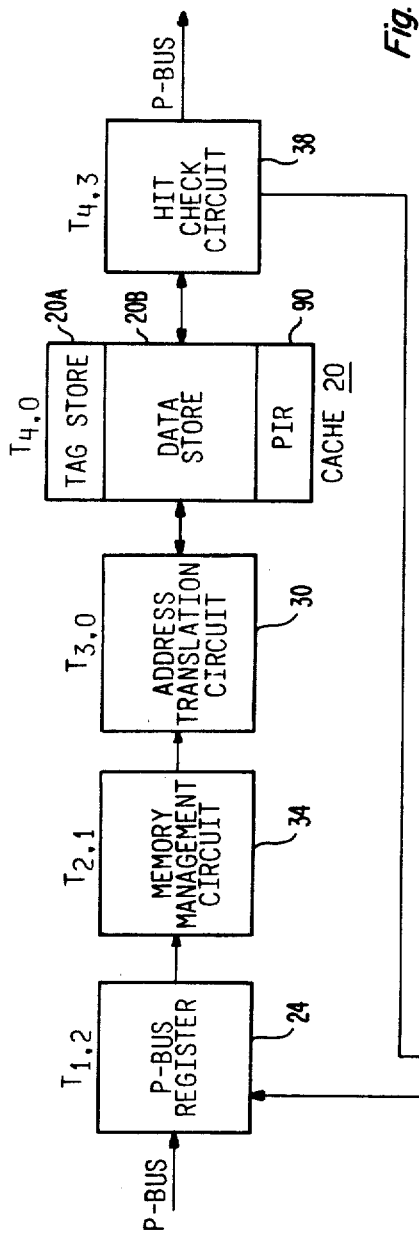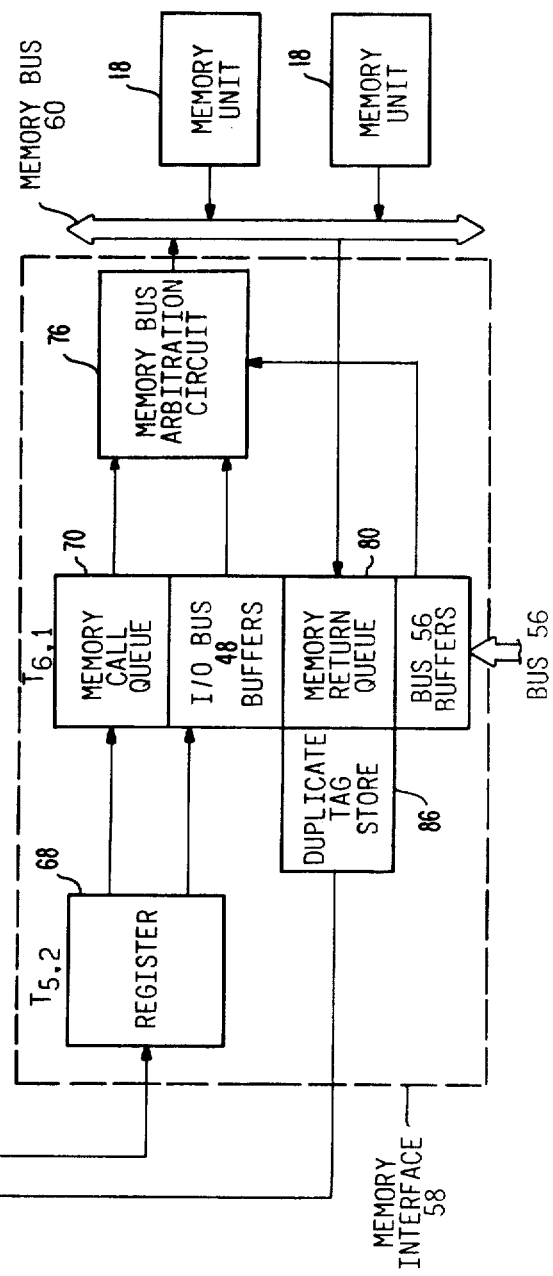
Fig. 5

DUPLICATE TAG STORE FOR CACHED MULTIPROCESSOR SYSTEM

CROSS REFERENCES TO RELATED U.S. PATENT APPLICATIONS AND PATENTS

References are made in the Description of an Illustrative Embodiment to the following patents and patent applications which are assigned to the same assignee as the following invention.

U.S. Pat. No. 3,815,099 issued June 4, 1974 for DATA PROCESSING SYSTEM,

U.S. Pat. No. 3,999,163 issued Dec. 21, 1976 for SECONDARY STORAGE FACILITY FOR DATA PROCESSING SYSTEMS, U.S. Pat. No. 4,045,781 issued Aug. 30, 1977 for MEMORY MODULE WITH SELECTABLE BYTE ADDRESSING FOR DIGITAL DATA PROCESSING SYSTEM, U.S. Pat. No. 4,229,791 issued Oct. 21, 1980 for DISTRIBUTED ARBITRATION CIRCUITRY FOR DATA PROCESSING SYSTEM.

BACKGROUND OF THE INVENTION

This invention relates to a digital data processing system, and more specifically, to a multiprocessor system comprised of a plurality of digital data processors sharing common control circuitry, memory and peripherals.

A number of digital data processing systems have been built heretofore based on multiple processors. These systems, herein after referred to as multiprocessor systems, have many diverse constructions. They have ranged from independent processors with no interconnection, through tightly coupled processor networks that communicate with each other by passing messages, to multiprocessors that share common control circuitry, memory and peripherals. An excellent discussion of multiprocessor systems and of the tradeoffs involved in system designs depending upon the degree of coupling and sharing involved in the systems is presented in Chapter 16 of the book entitled *Computer Engineering*, by C. Gordon Bell et al, Digital Press (1978).

Until recently, use of multiprocessor systems have been restricted to highly specialized applications, such as those requiring high availability, or high reliability and performance beyond that capable with a single processor with a given technology. One reason for this has been the widespread acceptance of the philosophy that a better higher performance single processor system can always be built. High performance in single processor systems, however, is generally achieved only at the expense of considerable additional design and engineering development which often restricts availability and involves trade-off in system reliability and flexibility. Further, for the end user desiring higher performance, the substitution of new single processor systems for existing systems can involve problems of system adaptation and training.

The advent of low-cost microprocessors with substantial functionability, such as those of the PDP-11 data processing family manufactured by the assignee hereof, has created new possibilities for multiprocessor systems. Because of the high availability and low cost per compute cycle of such microprocessors, multiprocessor systems comprised thereof have the potential of providing computational capabilities that span ranges typically covered by many conventional single processor systems at comparable costs. For the end user, they offer the advantage of enabling modular incremental growth over limited and well-defined performance ranges with minimum training and other field service costs.

It is, therefore, an object of this invention to provide a new and improved digital data processing system based on the use of multiple processors.

Another object of the invention is to provide a multiprocessor system that exhibits performance capabilities comparable to conventional single processor systems at comparable cost.

Another object of the invention is to provide a multiprocessor system that takes advantage of proven management and input/output control.

Still another object of the invention is to provide a multiprocessor system that exhibits a high degree of multiprocessing efficiency while maintaining a compatibility with existing processor protocols.

SUMMARY

A multiprocessor system embodied in accordance with this invention comprises a plurality of processors that share a common backing store memory, common input/output units, and a common control that includes a cache, or associative, memory. The processors communicate with the common control over a high speed, synchronous backplane bus. The resources in the common control necessary to respond to a processor-initiated data transfer transaction operate in an ordered pipeline timing sequence. Each resource is assigned a dedicated time slot during which that resource is available for use by the transaction. The time slot for use of the cache is made long enough to permit only one access to the cache. Further, the time slot for data transfers to and from the processors succeeds the time slot for use of the cache. This sequence is optimized for transactions that require only one access to the cache, e.g., read operations initiated by a processor that references a memory locations contained in the cache. When a transaction requires two cache accesses, only one is permitted during a first pipeline sequence. The second cache access occurs during a second, later pipeline sequence. Pipeline sequences intermediate to the first and second sequence are available for other transactions.

Transactions that require two cache accesses include those that allocate the cache during the second cache access and those that update the cache during the second cache access. The cache is allocated when both the tag of a given cache location and the data stored in that location are changed. The cache is updated when only the data stored in a given cache location is changed. Because there is a time gap between the two cache accesses of any given transaction and because other transactions can proceed during the time gap, it is possible for a particular cache location being updated to be allocated a different address tag before the update takes place. If the location is allocated a different tag before the update takes place, the subsequent update of the location with the different tag is erroneous.

In accordance with this invention, all data transfer transactions that require a memory reference, and thereafter, a second access to the cache are entered into a queue before the second access is permitted. The queue operates on a first-in-first-out basis, thus preserving order through the cache. Also, a duplicate tag store is maintained as a copy of the tag store in the cache. Whenever a cache tag is to be changed, a duplicate tag in the duplicate tag store is changed prior to changing the cache tag. The duplicate tag store is always checked prior to permitting a second access to the cache for an update. If a given cache location has recently been allocated a different tag, a check of the duplicate tag store reveals this, and an update of that location is not permitted. This prevents the cache location from being updated erroneously.

All write operations from secondary storage facilities in the multiprocessor system also enter the queue and also check the duplicate tag store to determine if the operations involve locations actually contained in the cache. Transfers from secondary storage facilities thus access the cache only when actual updates of cache locations are necessary.

The invention is pointed out with particularity in the appended claims. The above and further objects and advantages of the invention may be better understood by referring to the following detailed description taken in conjunction with the accompanying drawings.

BRIEF DESCRIPTION OF THE DRAWINGS

FIGS. 2A through 2E depict various clocking signals that synchronize transfers of information between the elements shown in FIG. 1;

FIGS. 3A through 3E depict the timing intervals for the elements shown in FIG. 1 when a processor performs a read operation to a memory location contained in the cache of FIG. 1;

FIGS. 4A through 4D depict the timing intervals for the elements shown in FIG. 1 when a processor performs a transaction requiring two accesses to the cache of FIG. 1; and FIG. 5 is a block diagram showing further details of the common control shown in FIG. 1.

DESCRIPTION OF ILLUSTRATIVE EMBODIMENT (1) General Description of Multiprocessor System FIG. 1 illustrates a multiprocessor system 10 that embodies our invention. The system 10 is comprised of a plurality of processors PC0, PC1, . . . PCn sharing common input/output (I/O) units 14 and common backing store memory units 18. The processors PC are interfaced to a common control CC and to each other by a high speed, synchronous, non-interlocked backplane bus called P-bus. The common control CC includes a cache, or associative, memory 20 that is shared by all of the processors PC and that operates synchronously with the P-bus. The I/O units 14 and memory units 18 are asynchronous to the P-bus.

Figure 1:
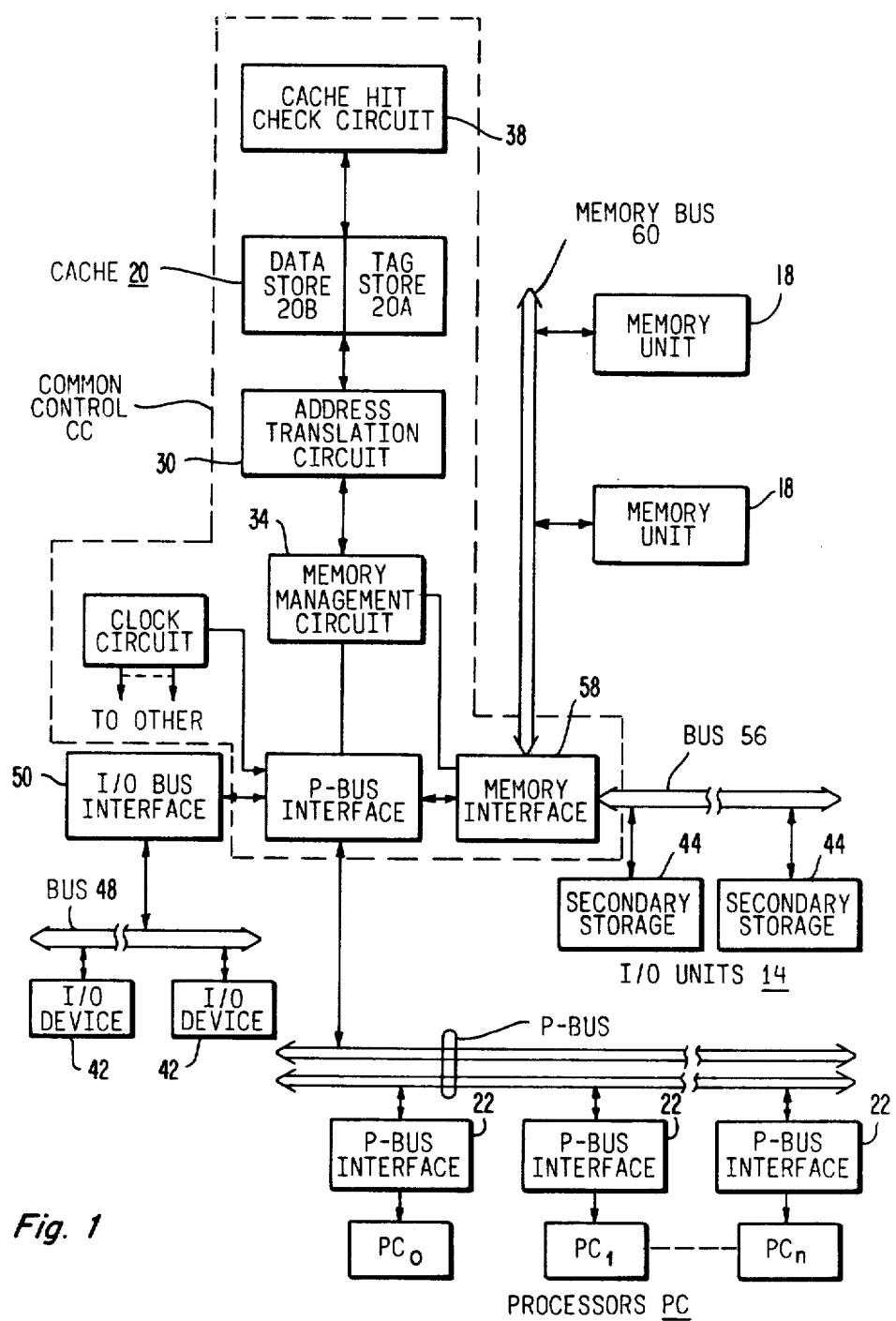
FIG. 1 is a block diagram of a multiprocessing system embodied in accordance with this invention.

In the specific embodiment of the multiprocessor system 10 described herein, the processors PC are PDP-11 data processing systems manufactured by the assignee hereof. They are implemented by LSI-11 chip sets, and interfaced through P-bus interface circuits 22 to the P-bus. The common control CC also interfaces to the P-bus through a similar P-bus interface circuit 24 which is identical to the interface circuits 22 used by the processors PC.

For details of the processors PC used in this specific embodiment, reference may be had to the *Microcomputer Processor Handbook* (1979) published by the assignee hereof.

The processors PC operate with virtual addresses. The common control CC thus includes an address translation circuit 30 that converts virtual addresses to physical addresses. The common control CC also includes a memory management circuit 34 and a cache hit check circuit 38. The memory management circuit 34 determines whether a given memory location defined by a virtual address received from the P-bus is one that can be accessed. Certain sections of the memory units 18 may be made inaccessible, while other sections may be made accessible only for certain types of transactions, such as memory reads only, memory writes only, and the like. The cache hit check circuit 38 determines whether the address received from the P-bus defines a location that is contained in the cache 20. If the address received during any transaction defines a location that is contained in the cache 20, the transaction is said to "hit" the cache 20. Otherwise, the transaction is said to "miss" the cache 20.

The cache 20 in this specific embodiment is a direct mapping, write-through cache capable of storing 16 K bytes of data with a block size of four bytes. The cache 20 includes an address tag store 20A, and a data store 20B having the same number of locations as the tag store 20A. Address information is stored in the tag store 20A, and data is stored in the corresponding locations of the data store 20B. A location in the cache 20 is said to be "updated" when only the data stored in the data store 20B of that location is changed. A cache location is said to be "allocated" when both its tag and data stores are changed.

Because of the write-through feature of the cache memory, all write operations to memory initiated by the processors PC update the backing store memory units 18, and those that write a corresponding word or a byte that is stored in the cache 20 also update the cache 20. All memory read operations initiated by the processors PC that miss the cache 20 allocate an entire block in the cache 20. Transactions initiated by the I/O units 14 that read memory loations do not reference the cache 20. Only those I/O transactions that involve a write to memory at locations stored in the cache 20 cause cache updates. The data stored in the cache 20 is always maintained in a valid condition, that is, the contents of the cache 20 are maintained equivalent to the corresponding locations of the backing store memory units 18 on an on-going basis.

For those desiring further details of the cache 20, memory management circuit 34, address translation circuit 30, and cache hit check circuit 38 used in this specific embodiment, reference may be had to U.S. Pat. No. 4,045,781.

The I/O units 14 may include general purpose I/O devices 42, such as teletypewriters, operator consoles, and the like, and secondary storage facilities 44, such as disk drives. The general purpose I/O devices 42 connect to a first asynchronous I/O bus 48 which, in this specific embodiment, is the bus described in U.S. Pat. No. 3,815,099. Transfers from the bus 48, like those from the processors PC, are communicated to the common control CC over the P-bus. Interface circuitry 50 formats transfers from the bus 48 before passing them to the P-bus interface circuit 24 in the common control CC. The interface circuitry 50 is also described in the above referenced U.S. Pat. No. 3,815,099.

The secondary storage facilities 44 connect to a second asynchronous bus 56 which, in this specific embodiment, is the bus described in U.S. Pat. No. 3,999,163. The bus 56 communicates directly with a memory interface circuit 58 in the common control CC. Transfers between the common control CC and the memory units 18, and between the bus 56 and the memory units 18, occur over a memory bus 60 that is also asynchronous. The memory bus 60 and backing store memory units 18 are described in the above referenced U.S. Pat. No. 4,045,781.

(2) The P-bus

The P-bus is divided into two sections: an address section, and a data section. The address section carries virtual address signals (VA) which identify memory locations, function code signals (F) which indicate what type of transaction is being done, and identification signals (ID) which indicate what devices are involved in the transaction. For example, the ID signals may indicate which device initiated the transaction or to what device the transaction is directed. In those cases where the ID identifies the initiating device, the transaction is directed to the common control CC.

Access to the P-bus is controlled by arbitration circuits that are distributed among the respective devices connected to the P-bus (i.e., the comon control CC and each of the processors PC). These arbitration circuits, which form part of the P-bus interface circuits 22 and 24, are described in the copending application of John V. Levy et al., Ser. No. 954,456 which is assigned to the assignee hereof. Each such device has a distinct priority and an independent request line that forms part of the address section of the P-bus. To gain access to the P-bus, the device asserts its request line, and if no higher priority request is present when the P-bus becomes available, the device wins control of the P-bus. The common control CC is assigned the highest priority. The processors PC have distinct, lower priorities determined by their respective positions along the P-bus. Requests for access to the P-bus from the I/O bus 48 are serviced through the request line of the common control CC.

A centerl clocking circuit 40 in the common control CC distributes timing signals that control transactions over the P-bus. These timing signals are distributed to each of the interface circuits 22 and 24. As shown in FIGS. 2A through 2D, the timing signals include P0 CLK through P3 CLK quadrature-phase signals, each having a 50% duty cycle. The leading edges of the P0 CLK through P3 CLK pulses define P0 through P3 clocking times, as shown in FIG. 2E. The time interval between successive P0 clocking times defines a complete bus cycle and therefore is called a bus cycle time. In general, any device seeking access to the P-bus asserts its request line at P0 during a given bus cycle. Arbitration is performed between P0 and P3 of that same bus cycle, and if control is won, it is awarded at P3 of that cycle. Other operations follow sequentially, as described below.

In this specific embodiment, the interval between successive P0 times, and therefore the bus cycle time, is about 133 nanoseconds.

(3) System Pipeline

The P-bus, and those parts of the common control CC needed by a processor PC to read data from the cache 20, are organized in a pipeline. Further, the design of the pipeline is optimized to minimize the access time of a processor PC doing a memory read that hits in the cache 20. The resources in the pipeline are the following:

(1) address section of the P-bus;
(2) memory management circuit 34 in common control CC;
(3) address translation circuit 30 in common control CC;
(4) cache 20;
(5) cache hit check circuit 38 in common control CC; and
(6) data section of the P-bus.

Anytime any device wins control of the P-bus, it is allocated all of the above pipeline resources. There is no way for any device to request less than all of the resources in the pipeline. However, not all of the resources need be used by the device. Thus, one or more resources may be idle during a given transaction if those resources are not necessary for the transaction.

The resources in the pipeline are always allocated sequentially in the order listed above. In other words, a device that wins control of the P-bus uses the address section of the P-bus during a first time slot that starts immediately when access to the P-bus is granted. The device then uses the memory management circuit 34 in the common control CC during a second time slot that starts at the end of the first time slot, and so on until use of the data section of the P-bus is completed. As noted, this order is selected to minimize the access time of a processor PC doing a memory read that hits in the cache 20. Cache simulation studies indicate that read hits predominate in PDP-11 data processing systems of the type used in this specific embodiment. See the above-reference book entitled *Computer Engineering*, by C. Gordon Bell et al., Digital Press (1978), paticularly Chapter 10 thereof. The beginning and end of each resource time slot are synchronized to the clocking times P0 through P3 of FIG. 2E, as explained below.

FIG. 3 illustrates the timing for a processor PC doing a memory read that hits in the cache 20. The clocking times P0 through P3 of FIG. 2E are repeated in FIG. 3A. Assume processor PC0, desiring to perform a memory read, asserts its request line at P0 of a given bus cycle. If the processor PC0 has the highest priority of those requesting the P-bus at that time, it is awarded the P-bus at P3 of the same bus cycle. The time interval between the request and the grant is labeled REQUEST in FIG. 3B.

From P3 of the same bus cycle to P2 of the next bus cycle, the processor PC0 uses the address section of the P-bus to transmit a function code F indicative of a memory read, its ID, and the virtual address VA of the memory location to be read to the common control CC. This time interval is labeled TRANSMIT in FIG. 3B.

From that P2 until the next P1, that is, during a MANAGE interval in FIG. 3B, the processor PC0 uses the memory management circuit 34 in the common control CC. During the MANAGE interval, the memory management circuit 34 checks the function code F and the virtual address VA received from the processor PC0 to determine if the location defined by the address is one for which a read is permitted. If the location can be read, the circuit 34 also generates a relocation constant.

From that P1 until the next P0, that is, during a TRANSLATE interval in FIG. 3B, the processor PC0 uses the address translation circuit 30 in the common control CC. An arithmetic unit in the circuit 30 adds the relocation constant to the virtual address VA received from the processor PC0 to generate a physical address PA.

The next interval is the CACHE interval. During this interval, the cache 20 is read using the physical address PA. The CACHE interval extends a full bus cycle, that is, from the last P0 until the P0 that follows it, and is thus the longest time interval of all the resources in the pipeline. The CACHE interval, however, is made long enough to permit only one access to the cache 20.

The next interval is HIT CHECK. During this interval, the cache hit check circuit 38 in the common control CC is used to determine if the read hit in the cache 20. The HIT CHECK interval extends from the P0 at the end of the CACHE interval to the next P3.

The last interval in FIG. 3B is the DATA interval. During the DATA interval, which extends from the last P3 to the next P2, the data section of the P-bus is used to transmit the data read from the cache 20 back to the processor PC0. At the end of the DATA interval, the memory read is completed.

If the hit check circuit 38 indicates that the memory read hit in the cache 20, the ID sent by the processor PC0 is not needed. The processor PC0, which is synchronized to the P-bus timing, strobes the data section of the P-bus during the DATA interval to receive the data. The ID is needed when the memory read misses the cache 20, as explained below.

At this stage of the description, some additional timing nomenclature is useful. As noted, all transactions begin when a device asserts its request line and end when the last resource in the pipeline completes its operation. Time from the beginning of a transaction can be counted in bus cycles and clocking times. Thus, let $T_{m,n}$ refer to a transaction time that occurs on the n-th clocking time after the m-th bus cycle after the beginning of a transaction. Thus, for example, the processor PC0 described above doing a memory read asserts its request line at $T_{0,0}$, uses the address section of the P-bus from $T_{0,3}$ until $T_{1,2}$, and so on until it receives the data at $T_{5,2}$. The timing of the pipeline for the processor PC0 is shown in FIG. 3B in terms of transaction times $T_{m,n}$.

It is possible to allocate the resources of the pipeline for a memory read that hits in the cache 20 at P3 of each consecutive P-bus cycle. If this happens, every resource in the pipeline at a given time will be doing an operation for a difference memory read. FIG. 3D shows the timing for a read hit that is initiated by a processor PC1 having a lower priority than the processor PC0 described above. FIG. 3E shows the timing for the read hit by the processor PC1 in terms of transaction times $T_{m,n}$.

With the pipeline resource organization described above, the data section of the P-bus is used after the cache 20 is accessed. As a result, memory reads that hit in the cache 20 require only one pass through the pipeline to retrieve the desired data. However, memory reads that miss in the cache 20, and all memory writes, require access to the backing store memory units 18. Further, to maintain the validity of the data stored in the cache 20, memory read misses must allocate the cache 20 (i.e., change both its tag store 20A and data store 20B), while memory writes into locations contained in the cache 20 must update the cache 20 (i.e., change its data store 20B). Thus, unlike read hits, read misses and writes require a second pass through the pipeline resources. The latter transactions are explained below.

(4) Common Control

FIG. 5 illustrates further details of the common control CC. The operation of the common control CC is best illustrated by describing how it responds to memory reads that miss in the cache 20 and to memory writes. Read misses will be discussed first.

Assume processor PC2 desires to read data from a memory location that is not contained in the cache 20. The processor PC2 will proceed synchronously through the resources of the pipeline in the same manner described above for the processor PC0 doing a read that hits in the cache 20. In fact, data is sent back to the processor PC2 over the data section of the P-bus during the DATA interval of the pipeline even if the hit check circuit 38 determines that the read missed in the cache 20. The data returned is thus incorrect. To account for this, the hit check circuit 38, upon detecting a miss, negates a DATA VALID signal and transmits the negated DATA VALID signal back to the processor PC2 over the data section of the P-bus with the incorrect data. The negated DATA VALID signal puts the processor PC2 in a WAIT state until, during TRANSMIT interval of a subsequent pipeline sequence, the processor PC2 senses its own ID on the P-bus. The correct data for the location read by the processor PC2 is received from the data section of the P-bus during the DATA interval of that subsequent pipeline sequence.

Transaction times are indicated above the components shown in FIG. 4. They indicate the time when the corresponding component completes its operation in the pipeline.

As noted, the processor PC2 is attempting a read from a memory location that is not contained in the cache 20. Upon detecting the miss, the hit check circuit 38 enters a function code F for a read, the ID of the processor PC2, and the physical address PA of the memory location to be read in a register 68 in the memory interface circuit 58. The information is latched into the register 58 at $T_{5,2}$. At $T_{6,1}$, the same information is entered in a memory call queue 70. Once the information is stored in the memory call queue 70, the first pass of the read miss through the pipeline resources is completed.

As noted previously, the memory bus 60 operates asynchronously with respect to the P-bus. The memory call queue 70 invokes memory accesses asynchronously through a memory bus arbitration circuit 76 until the queue is empty. The memory bus arbitration circuit 76 is described in the above referenced U.S. Pat. No. 4,045,781. Order is preserved through the memory call queue 70; that is, memory accesses through the queue 70 are thus treated on a first-in-first-out basis.

After the memory call queue 70 arbitrates and wins control of the memory bus 60, it accesses the desired location in the backing store memory units 18. After the memory access is completed, the physical address PA and data read from the memory units 18 are passed from the memory bus 60 to a memory return queue 80. Like the queue 70, the memory return queue 80 operates on a first-in-first-out basis. A duplicate tag store 86 is also maintained at the entry to the memory return queue 80 as a copy of the tag store 20A in the cache 20. Upon entry of the data in the memory return queue 80, a duplicate tag in the duplicate tag store 86 is written indicative of the physical address PA of the memory location just read. The purpose of the duplicate tag store 86 will be explained below.

With the data from memory stored in the memory return queue 80, the common control CC must request the pipeline in order to again access the cache 20 and to send the correct data back to the processor $PC_2$, which initiated the read transaction that missed in the cache 20. The common control CC thus initiates a new transaction by asserting its request line at $T_{0,0}$ of a new bus cycle. As with all devices connected to the P-bus, the common control CC must arbitrate for access to the P-bus. The common control CC, however, has the highest priority of all P-bus devices. When access to the P-bus is granted a $T_{0,3}$, the common control CC places a function code F indicative of a read, the physical address PA and the ID from the memory return queue 80 on the address section of the P-bus. At $T_{4,0}$, the common control CC allocates the cache 20 by writing the tag store 20A of the cache 20 with the physical address PA of the memory location just read and by inserting the data in the corresponding location of the cache data store 20B. At $T_{4,3}$, the data is placed on the data section of the P-bus for reception by the processor $PC_1$. The read miss operation is then complete.

From a device point of view, write operations to locations in memory are simple. The device initiating such a write transaction requests the pipeline, places virtual address information VA on the address section of the P-bus during the TRANSMIT interval, places the data to be written on the data section of the P-bus during the DATA interval, and is then done. For the common control CC, however, writes are more involved. The common control CC must update the cache 20 if the location being written is also contained in the cache 20. Since the order of the resources in the pipeline is such that the data to be written is not available to the common control CC when the cache 20 is accessed during the first pass through the pipeline, a second pipeline pass must be initiated.

If, during the first pass through the resources of the pipeline, the common control CC detects a function code F indicative of a write to memory, it places the function code F, the physical address PA of the location to be written and the data to be written in the register 68. The information is then transfered to the memory call queue 70 and the first pass through the pipeline resources is completed.

After the memory call queue 70 arbitrates and wins control of the memory bus 60, it does a write in the backing store memory units 18. When the memory cycle is completed, the data transferred to memory and the physical address PA of the location just written are loaded into the memory return queue 80. The duplicate tag store 86 is then checked to determine if the memory location just written is one that is contained in the cache 20. If it is not, the common control CC is done processing the write. If it is, then the common control CC requests the pipeline to initiate a second pass through the resources of the pipeline. During the second pass, the data store 20B of the cache 20 is updated with the data written to memory.

As noted, the duplicate tag store 86 is maintained as a copy of the tag store 20A in the cache 20. The validity of this copy is maintained by interlocking changes in the duplicate tag 86 with changes in the cache tag store 20A. The duplicate tag store 86 prevents a particular cache location that has yet to be updated by a write that hits in the cache 20 from being reallocated by a read command to different memory location between the two passes of the write through the resources of the pipeline. Such an erroneous reallocation could occur, for example, if the second pass of a read that missed the cache 20 occurred in time between the first and second pass of a write.

To illustrate, assume that the duplicate tag store 86 is eliminated, and that at a given time T0, cache location X corresponds to memory location A. Assume also that, at the time T0, the first pass of a read command through the resources of the pipeline that misses the cache 20 is completed, but not the second pass of that read. At a later time T1, a write to memory location A is received by the common control CC. Because memory location A is contained in cache location X, the write would be treated like a cache hit. Assume further that at time T2, the second pass of the read that missed the cache 20 allocates cache location X to a different memory location, e.g., memory location B. At time T3, the second pass of the write being treated as a cache hit updates cache location X with the new data from memory location A. This results in erroneous data being stored in cache location X.

This problem is avoided according to the invention through the implementation of the duplicate tag store 86 at the entry of the memory return queue 80. It was recognized that only entries from the memory return queue 80 can change a cache tag. By placing the duplicate tag store 86 at the entry to the memory return queue 80 and by preserving order through the queue 80, it can be assured that the tag found in the duplicate tag store 86 is identical to that actually in the cache 20 at the time the particular entry reached the cache 20. If a particular cache location X happens to be reallocated to a new memory location before the write starts its second pass through the pipeline, a check of the duplicate tag store 86 reveals this. In that event, the write is treated as a cache miss even though the desired location may have been in the cache 20 during the first pass through the resources of the pipeline. As a result, the cache 20 is not erroneously updated.

The duplicate tag store 86 serves another purpose. As noted, the contents of the backing store memory units 18 can be changed by the secondary storage facilities 44. When a memory location that is in the cache 20 is changed by an I/O transaction from the units 44, this change must be reflected in the contents of the cache 20. It is inefficient, however, to go through the cache 20 continually whenever the contents of the memory units 18 are changed by the units 44.

In this system, all accesses to the backing store memory units 18, including those from the secondary storage facilities 44, are serviced through the memory call queue 70 and memory return queue 80 with order preserved. This eliminates conflicts between transactions initiated by the units 44 and those initiated by P-bus devices which involve the same location in the memory units 18. Further, transaction from the units 44, like those from P-bus devices, check the duplicate tag store 86 prior to initiating a cache update. If the duplicate tag store 86 indicates that the location written to by the units 44 is in the cache 20, the cache 20 is updated; otherwise, it is not. This allows the cache 20 to be used only when an actual update is necessary thereby eliminating continual use of the cache 20 for every memory location written by the units 44. In this manner, the cache 20 can be utilized for P-bus activity without sharing the bandwidth of the cache 20 with updates from the units 44.

As noted, writes that hit a given location in the cache 20 require a second pass through the resources of the pipeline to update the cache 20. It is possible that a processor $PC_n$ that is in the process of updating the location will attempt to read the same location before the update is completed. This would result in the return of unmodified, invalid data.

This problem could be avoided by invalidating the location in the cache 20 that is being written on the first pass of the write through the resources of the pipeline. However, this would force the processor performing the write to be stalled for the entire duration of the write. It could also result in the invalidation of a cache location being used by another P-bus device. Both would degrade overall system performance.

In accordance with the invention, a processor indexed RAM (PIR) 90 is implemented as part of the cache 20. The PIR 90 is used in lieu of any cache invalidation scheme. The PIR 90 includes one location for each processor PC in the system 10. The PIR 90 is indexed by the ID of the processors PC and is one bit wider than the 12-bit index of the cache 20. The additional bit in the PIR index is used as an indicator of when a write operation is in progress.

On the first pass of a write transaction through the resources of the pipeline, the location of the PIR 90 corresponding to the processor $PC_n$ performing the write is written with the tag of the memory location to be written. At the same time, the additional bit in that location of the PIR 90 is set. Whenever a processor $PC_n$ attempts to read a location in the cache 20, it accesses its corresponding location in the PIR 90 during the CACHE time interval and checks the tag and the additional bit stored therein to determine if the location it is trying to read is one for which it has a write in progress. If it is, the read operation is treated as a read miss even if the location to be read is in the cache 20. The read is thus forced to enter the memory call queue 70 behind the write. If it is not, the read operation proceeds as it would normally, i.e., a read hits in the cache if the location is in the cache 20, or a read misses in the cache if the location is not in the cache 20. When the write passes through the resources of the pipeline the second time, it clears the additional bit in the PIR 90 during the CACHE interval to signify that the write to the location has been completed.

FIG. 4B illustrates the timing for a read operation that is initiated by the processor $PC_2$ and that misses the cache 20. FIG. 4C illustrates the timing for a write operation that is initiated by a processor $PC_3$ that hits the cache 20. Processor $PC_3$ has a lower priority than processor $PC_2$. FIG. 4D illustrates the timing for a write operation that is initiated by a processor $PC_4$ that misses the cache 20. Processor $PC_4$ has a lower priority than processor $PC_2$ and processor $PC_3$. The clocking times P0 through P3 are shown in FIG. 4A.

In this specific embodiment, the PIR 90 includes only one location for each processor PC in the system 10. Thus, the PIR 90 can account for only a single write in progress for each processor $PC_n$. It is possible, however, for any given processor $PC_n$ to have more than one write operation in progress at a given time. If that happens, the PIR 90 prevents only the first of the locations being written to from being read. The succeeding locations being written to can be read by the processor $PC_n$, resulting in the return of invalid data.

In this specific embodiment, this problem is avoided through the implementation of a WRITE IN PROGRESS (WIP) flag in the hardware of the processors $PC_n$. The WIP flag, in effect, prevents any single processor $PC_n$ from having more than one write outstanding at any given time. When a processor $PC_n$ desires to initiate a write operation, it checks its own WIP flag before it requests the P-bus. If the WIP flag is set, then the processor $PC_n$ continues to check the WIP flag until the WIP flag is cleared. When the WIP flag is cleared, the processor $PC_n$ requests the P-bus, transmits its ID, a write function code F and the VA of the location to be written over the address section of the P-bus, and then sets its WIP flag. When the processor $PC_n$ is thereafter informed that the common control CC has accessed the pipeline resources to update the cache and to clear the additional bit in the PIR 90, it clears its own WIP flag. With this approach, all write operations that hit in the cache must be forced to make a second pass through the pipeline resources, even if a check of the duplicate tag store 86 indicates that the location being written to is not contained in the cache 20, so as to clear the additional bit in the PIR 90 and the WIP flag in the processor PC.

As an alternative to this approach, the PIR 90 could be implemented so as to include more than one location for each processor PC in the system 10. The PIR 90 would then be capable of accounting for the case where a single processor PC has more than one write operation outstanding at any given time.

The foregoing description is limited to a specific embodiment of this invention. It will be apparent, however, that this invention can be practiced with data processing systems having diverse basic construction or with systems that use different internal circuitry than is described in this specification with the attainment of some or all of the foregoing objects and advantages of this invention. Therefore, it is the object of the appended claims to cover all such variations and modifications as come within the true spirit and scope of this invention.

What we claim as new and desire to secure by Letters Patent of the United States is:

1. A multiprocessor system comprising:
   A. main memory means (18) including a plurality of addressable storage locations for storing data and for generating address, data and memory control signals;
   B. A plurality of processor units (22) for processing data in response to instructions and for generating signals including address, data, and writing control signals for initiating transactions that access addressable storage locations in said main memory means;
   C. common control means shared by said processor units and said main memory means, said common control means including
      i. receiving means (24) for receiving said address, memory control, writing control, and data signals from said processor units and said main memory means,
      ii. write-through cache memory means (20) including a plurality of addressable storage locations each having a tag portion (20A) for storing a tag address that identifies a certain location in said main memory means and a corresponding data portion (20B) for storing a copy of the data stored in that location of said main memory means, said cache memory means further including updating means connected to said receiving means and responsive to said writing control signal for forgoing the writing of data signals into the data portion thereof and responsive to said memory control signal for writing the data portion of said cache memory means corresponding to an address in the main memory means;

iii. transmitting means (38) connected to said receiving means for transmitting said address, writing control, and data signals to said main memory means;

D. processor bus means (P-Bus) interconnecting said processor units and said common control means for transferring said address, writing control and data signals associated with the transactions among said processor units and said common control means;

E. memory bus means (60) interconnecting said common control means and said main memory means for transferring said address, writing control, memory control, and data signals associated with the transactions between said common control means and said memory means; and F. said common control means further including:

ii. first queing means (70) interposed between said transmitting means and said memory bus means for receiving said address, writing control and data signals and for subsequently transmitting said signals to said memory bus means;

iii. duplicate tag storage means (86) connected to said cache memory means for maintaining copies of the tag address information stored in the tag portion of said cache memory means; and iv. second queing means (80) connected to said duplicate tag storage means and being interposed between said memory bus means and said receiving means for receiving on a first-in-first out basis said address, memory control and data signals from said main memory means, said second queing means being operative to subsequently transmit to said receiving means said address, memory control, and data signals when said address signal matches an address contained in said duplicate tag storage means thereby to enable said updating means to write the data portion of said cache memory means.

2. A multiprocessor system as recited in claim 1 wherein said duplicate tag storage means comprises:

(a) monitoring means connected to the entry of the second queing means for detecting all read transactions scheduled to allocate said cache memory means, and (b) address signal receiving means for storing said main memory addresses when said read transaction is received by said second queing means thereby to effect changes in the duplicate tag storage means prior to changing the tag portion of said cache memory means.

3. A multiprocessor system as recited in claims 1 or 2 wherein said common control means includes means connected to said second queing means and said updating means for foregoing an updating operation when said cache memory means is scheduled to be allocated by reading transactions that is queued in said second queing means.

* * * * *